United States Patent
Tanba et al.

(10) Patent No.: US 10,310,779 B2
(45) Date of Patent: Jun. 4, 2019

(54) IMAGE FORMING APPARATUS AND IMAGE FORMING SYSTEM WHICH REDUCE COLOR MATERIAL CONSUMPTION

(71) Applicant: KYOCERA Document Solutions Inc., Osaka (JP)

(72) Inventors: Masato Tanba, Osaka (JP); Kyoichiro Hayashi, Osaka (JP); Shuntaro Tsuji, Osaka (JP); Akihiko Ikazaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/991,735

(22) Filed: May 29, 2018

(65) Prior Publication Data

US 2018/0349073 A1 Dec. 6, 2018

(30) Foreign Application Priority Data

Jun. 2, 2017 (JP) .................................. 2017-110077

(51) Int. Cl.

| G06K 15/00 | (2006.01) |
|---|---|
| G06F 3/12 | (2006.01) |
| H04N 1/00 | (2006.01) |
| G03G 15/00 | (2006.01) |
| G03G 15/01 | (2006.01) |

(52) U.S. Cl.
CPC ....... *G06F 3/1219* (2013.01); *G03G 15/5062* (2013.01); *G06F 3/1208* (2013.01); *H04N 1/00411* (2013.01); *H04N 1/00456* (2013.01); *G03G 15/0131* (2013.01)

(58) Field of Classification Search
None
See application file for complete search history.

(56) References Cited

U.S. PATENT DOCUMENTS

| 2005/0052695 | A1* | 3/2005 | Fukunaga | .......... H04N 1/00132 |
|---|---|---|---|---|
| | | | | 358/1.15 |
| 2007/0019222 | A1* | 1/2007 | Oda | ...................... G06F 3/1204 |
| | | | | 358/1.13 |
| 2010/0238471 | A1* | 9/2010 | Sakiyama | ............. G06F 3/1206 |
| | | | | 358/1.9 |

(Continued)

FOREIGN PATENT DOCUMENTS

JP       2010-39334 A    2/2010

*Primary Examiner* — Henok Shiferaw
(74) *Attorney, Agent, or Firm* — Stein IP, LLC

(57) ABSTRACT

The image forming apparatus executes a process of generating image data of an alternative image involving a smaller consumption quantity of color material than an image contained in a replacement-object area and then generating replaced image data in which the image data of the replacement-object area has been replaced with the image data of the alternative image, and the control section instructs a printing section to execute color material-saving printing of printing an image based on the replaced image data on a sheet. The alternative image is an image containing information for allowing an image based on the image data of the replacement-object area to be displayed by an information terminal that has read the alternative image.

6 Claims, 7 Drawing Sheets

(56) References Cited

U.S. PATENT DOCUMENTS

2015/0022861 A1* 1/2015 Oguro ................ G06K 15/1815
                                                    358/1.16
2015/0277837 A1* 10/2015 Oguro .................. G06F 3/1243
                                                    358/1.13
2016/0176200 A1* 6/2016 Watanabe ................ B41J 11/60
                                                    347/110

* cited by examiner

IMAGE FORMING APPARATUS AND IMAGE FORMING SYSTEM WHICH REDUCE COLOR MATERIAL CONSUMPTION

INCORPORATION BY REFERENCE

This application is based upon and claims the benefit of priority from the corresponding Japanese Patent Application No. 2017-110077 filed on Jun. 2, 2017, the entire contents of which are incorporated herein by reference.

BACKGROUND

The present disclosure relates to an image forming apparatus and an image forming system for printing images on paper sheets with use of color material.

Conventionally, there has been known an image forming apparatus capable of reducing consumption quantity of color material to be used for printing.

A conventional image forming apparatus, prior to printing of images based on printing-use image data on paper sheets, displays thumbnail images generated from the printing-use image data to accept a user's selection of images that are to be actually printed on sheets from among the thumbnail images. With the conventional image forming apparatus, when the user selects images other than images which, as is predictable, would lead to increases in consumption quantity of the color material, it follows that only the selected images are printed on the sheets. Thus, the consumption quantity of color material can be reduced.

SUMMARY

An image forming apparatus according to a first aspect of the present disclosure includes a printing section and a control section. The printing section prints an image onto a paper sheet with use of color material. The control section generates printing-use image data for allowing the printing section to execute printing, and moreover controls the printing section. The control section executes an image detection process of detecting, as a replacement-object area, an area containing an image involving a larger consumption quantity of the color material than a predetermined threshold value out of the printing-use image data, where when the replacement-object area is detected, the control section executes a data generation process of generating image data of an alternative image involving a smaller consumption quantity of the color material than the image contained in the replacement-object area and then generating replaced image data in which the image data of the replacement-object area out of the printing-use image data has been replaced with the image data of the alternative image, and the control section further executes an image storing process of storing the image data of the replacement-object area in a specified storage region, and instructs the printing section to execute color material-saving printing of printing an image based on the replaced image data on a sheet. The alternative image is an image containing information for allowing the image based on the image data of the replacement-object area to be displayed by an information terminal that has read the alternative image.

An image forming system according to a second aspect of the disclosure includes the above-described image forming apparatus, a server, and an information terminal. The server stores image data of the replacement-object area. The information terminal includes a camera and a display, and reads the alternative image by the camera and displays an image based on the image data of the replacement-object area on the display.

DETAILED DESCRIPTION

Configuration of Image Forming System

Figure 1:
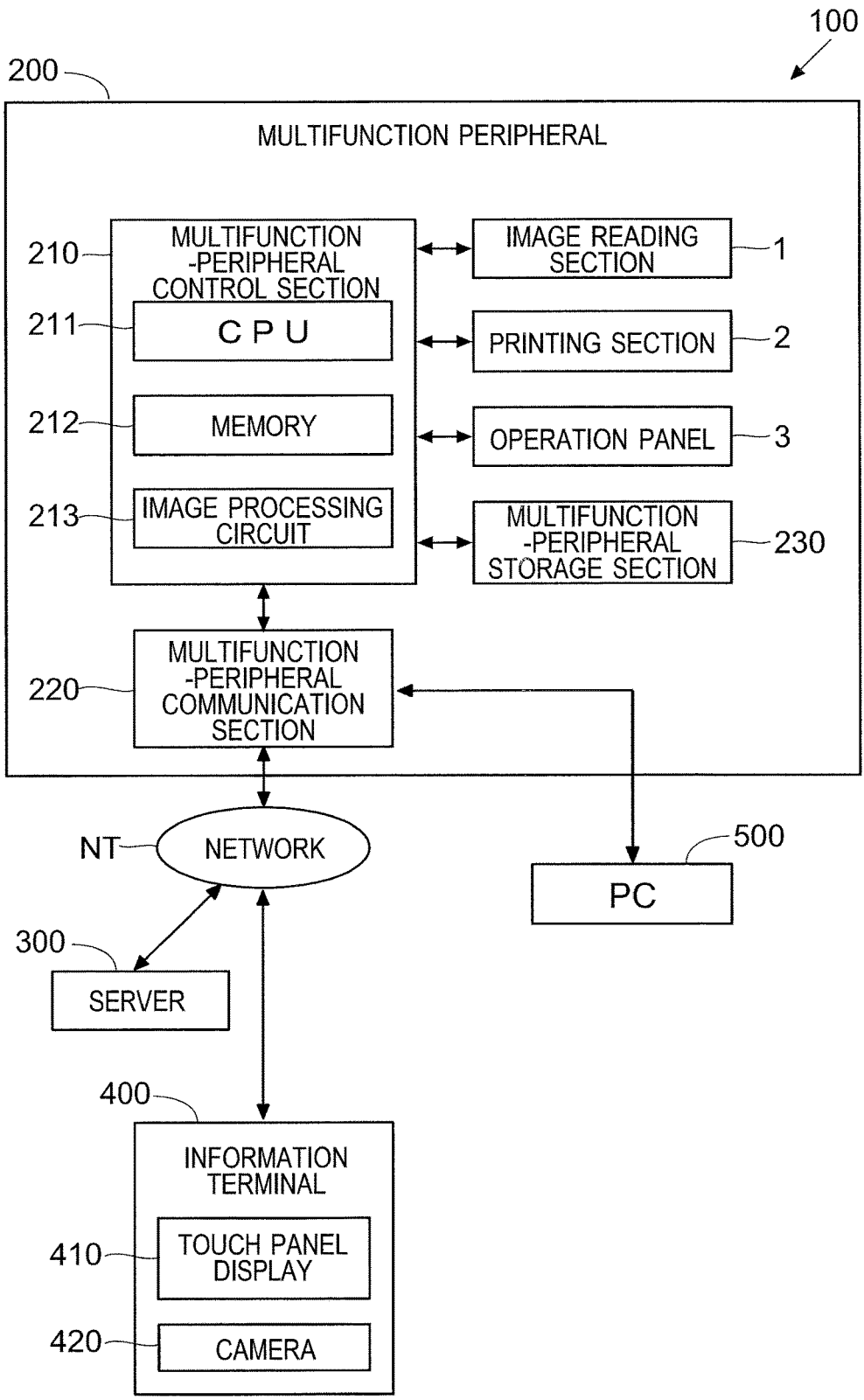
FIG. 1 is a diagram showing a configuration of an image forming system according to one embodiment of the disclosure.

As shown in FIG. 1, an image forming system 100 of this embodiment includes a multifunction peripheral 200, a server 300 and an information terminal 400. The multifunction peripheral 200, the server 300 and the information terminal 400 are communicatably connected to one another via a network NT such as LAN or Internet. It is noted that the multifunction peripheral 200 corresponds to 'image forming apparatus.' The server 300 corresponds to 'storage region.'

Figure 2:
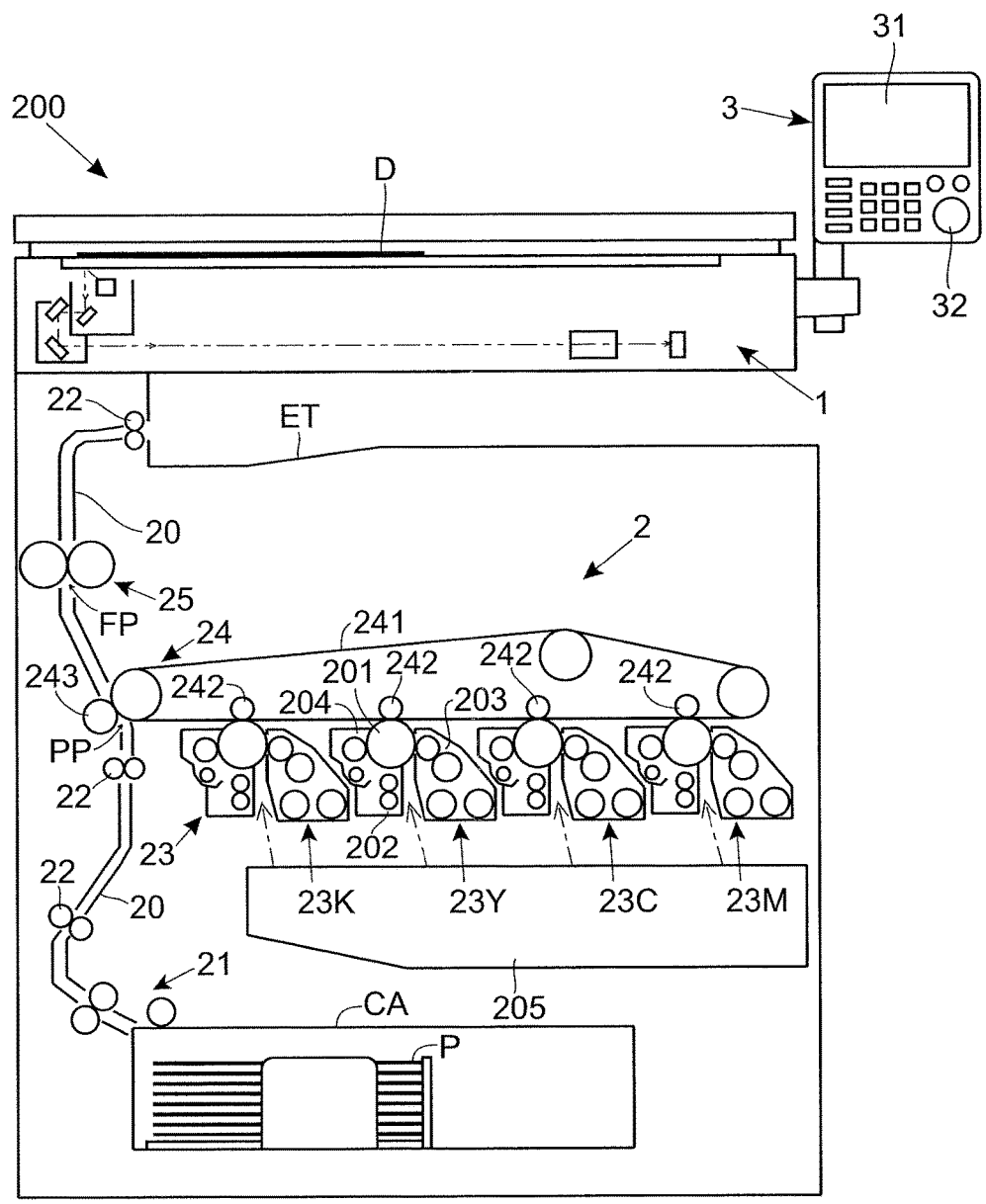
FIG. 2 is a schematic view of a multifunction peripheral of the image forming system according to one embodiment of the disclosure.

As shown in FIG. 2, the multifunction peripheral 200 includes an image reading section 1. The image reading section 1 reads a document D to generate image data of the read document D. In other words, the image reading section 1 feeds image data of the document D obtained by reading of the document D, as an input, to the multifunction peripheral 200.

The multifunction peripheral 200 also includes a printing section 2. The printing section 2 conveys a paper sheet P, forms an image (toner image) to be printed, and prints the image on the sheet P under conveyance. The printing section 2 includes a sheet feed part 21, a conveyance part 22, an image forming part 23, an intermediate transfer part 24, and a fixing part 25.

The sheet feed part 21 includes a pickup roller and a sheet feed roller pair. The pickup roller pulls out a sheet P from a sheet feed cassette CA. The sheet feed roller pair feeds the sheet P pulled out from the sheet feed cassette CA to a sheet conveyance path 20.

The conveyance part 22 includes a plurality of conveyance roller pairs. The conveyance part 22 conveys the sheet P, which has been fed to the sheet conveyance path 20, to a printing position PP (transfer nip) and a fixing position FP (fixing nip), sequentially. Then, the conveyance part 22 discharges the printed sheet P to a discharge tray ET.

The image forming part 23 includes image forming units 23K, 23Y, 23C and 23M corresponding to individual colors of black (K), yellow (Y), cyan (C) and magenta (M), respectively. Each of the image forming units 23K, 23Y, 23C and 23M includes one photosensitive drum 201, one charging device 202, one developing device 203, and one cleaning device 204. The image forming part 23 also includes an exposure unit 205 to be shared among the individual colors. The image forming part 23, receiving toner supply from a toner container (not shown), forms toner images of individual colors on surfaces of their corresponding photosensitive drums 201, respectively.

The intermediate transfer part 24 includes an intermediate transfer belt 241, primary transfer rollers 242, and a secondary transfer roller 243. Each primary transfer roller 242 nips the intermediate transfer belt 241 against the photosensitive drum 201. The secondary transfer roller 243 forms a transfer nip (transfer nip position corresponds to printing position PP) against the intermediate transfer belt 241. The intermediate transfer part 24, first, primarily transfers the toner images formed by the image forming part 23 to the intermediate transfer belt 241, and then secondarily transfers the toner images transferred to the intermediate transfer belt 241 onto the sheet P.

The fixing part 25 includes a fixing roller pair. Individual rollers of the fixing roller pair make press contact with each other to form a fixing nip (fixing nip position corresponds to fixing position FP). Then, the fixing part 25 heats and pressurizes the sheet P passing through the fixing position FP so that the toner images are fixed to the sheet P.

The multifunction peripheral 200 further includes an operation panel 3. The operation panel 3 accepts instructions and settings from a user of the multifunction peripheral 200. It is noted that the operation panel 3 corresponds to 'acceptance part.'

The operation panel 3 includes a touch panel display 31. The touch panel display 31 displays a screen with software keys provided therein to accept touch operations on the display screen (software keys). The operation panel 3 also has a plurality of hardware keys 32 provided thereon. An example of the hardware keys 32 is a start key for accepting a job execution instruction.

Reverting to FIG. 1, the multifunction peripheral 200 includes a multifunction-peripheral control section 210, a multifunction-peripheral communication section 220, and a multifunction-peripheral storage section 230. It is noted that the multifunction-peripheral control section 210 corresponds to 'control section.' The multifunction-peripheral control section 210 is connected to the multifunction-peripheral communication section 220 and the multifunction-peripheral storage section 230.

The multifunction-peripheral control section 210 includes a CPU 211, memory 212 (ROM and RAM), and an image processing circuit 213. The CPU 211 operates based on control-dedicated programs and data to execute processes for controlling individual sections and parts of the multifunction peripheral 200. The memory 212 stores programs and data for operating the CPU 211.

The image processing circuit 213 includes application specific integrated circuits (ASIC) and memory for executing various types of image processing (e.g., RIP process, rotation process, density conversion process, scale-up/down process, etc.) on image data. The multifunction-peripheral control section 210 executes various types of image processing on image data by using the image processing circuit 213. Further, the multifunction-peripheral control section 210 executes later-described economy printing process (image detection process, data generation process, etc.) by using the image processing circuit 213.

The multifunction-peripheral control section 210 is connected to the image reading section 1 and the printing section 2 to control reading operation of the image reading section 1 and printing operation of the printing section 2. Also, the multifunction-peripheral control section 210 is connected to the operation panel 3 to control display operation of the operation panel 3 and detect operations performed on the operation panel 3.

The multifunction-peripheral communication section 220 includes communication circuits, communication memory, and a communication connector. The multifunction-peripheral control section 210 communicates with external devices by using the multifunction-peripheral communication section 220. For example, a personal computer (PC) 500 to be used by the user of the multifunction peripheral 200 is communicatably connected as an external device to the multifunction peripheral 200. Installing a printer driver on the PC 500 allows the multifunction peripheral 200 to be used as a printer. That is, images based on print data (e.g., PDL data) transmitted from the PC 500 to the multifunction peripheral 200 can be printed on the sheet P.

The multifunction-peripheral communication section 220 is further connected to the network NT. The multifunction-peripheral control section 210 accesses the network NT by using the multifunction-peripheral communication section 220. Thus, it becomes implementable to transmit and receive information between the multifunction peripheral 200 and the server 300.

The multifunction-peripheral storage section 230 includes a nonvolatile storage device such as HDD and ROM. The multifunction-peripheral control section 210 stores information in the multifunction-peripheral storage section 230, and reads out information from the multifunction-peripheral storage section 230.

The server 300 includes a mass storage device such as HDD. The server 300 stores therein information received from the multifunction peripheral 200.

The information terminal 400 includes a touch panel display 410 and a camera 420. The information terminal 400 is a smartphone or a tablet terminal, as an example, to be used by the user of the multifunction peripheral 200. In addition, a code reader application for reading code information such as two-dimensional code is installed on the information terminal 400. Further, an AR (Augmented Reality) application for implementing display (AR display) with use of AR technique is installed on the information terminal 400.

<Economy Printing>

Upon input of print data to the multifunction peripheral 200, the multifunction-peripheral control section 210 decides that it has received a print-job execution request. For copying of the document D, image data of the document D obtained by reading of the document D by the image reading section 1 is inputted as print data to the multifunction peripheral 200. With the multifunction peripheral 200 used as a printer, print data such as PDL data transmitted from the PC 500 (print data received by the multifunction-peripheral communication section 220) is inputted to the multifunction peripheral 200.

Upon decision of having received a print-job execution request, the multifunction-peripheral control section 210 executes various types of image processing (e.g., RIP process) on the print data to generate printing-use image data.

With plural-page print data inputted to the multifunction peripheral 200, printing-use image data for plural pages are generated sequentially page by page. Then, the multifunction-peripheral control section 210 instructs the printing section 2 to print based on the printing-use image data. The printing section 2 prints, on the sheet P, images based on the printing-use image data with use of toner (corresponding to 'color material').

In this connection, in cases where solid (filled-in) images are included in print images to be printed on the sheet P, large amounts of toner consumption are involved. Therefore, replacement time for the toner container is accelerated. Frequent printing of images including solid images would cause the replacement frequency of the toner container to go higher, bothering the user.

For this reason, the multifunction peripheral 200 is equipped with an economy printing function for saving the quantity of toner to be consumed for printing. With the economy printing function, an economy printing process is executed by the multifunction-peripheral control section 210. As will be detailed later, the economy printing process includes an image detection process and a data generation process. By virtue of this, in cases where a solid image is included in print images, an image involving a smaller consumption quantity of toner than the solid image is printed instead of the solid image. In other words, the printing section 2 executes toner-saving printing.

Figure 3:
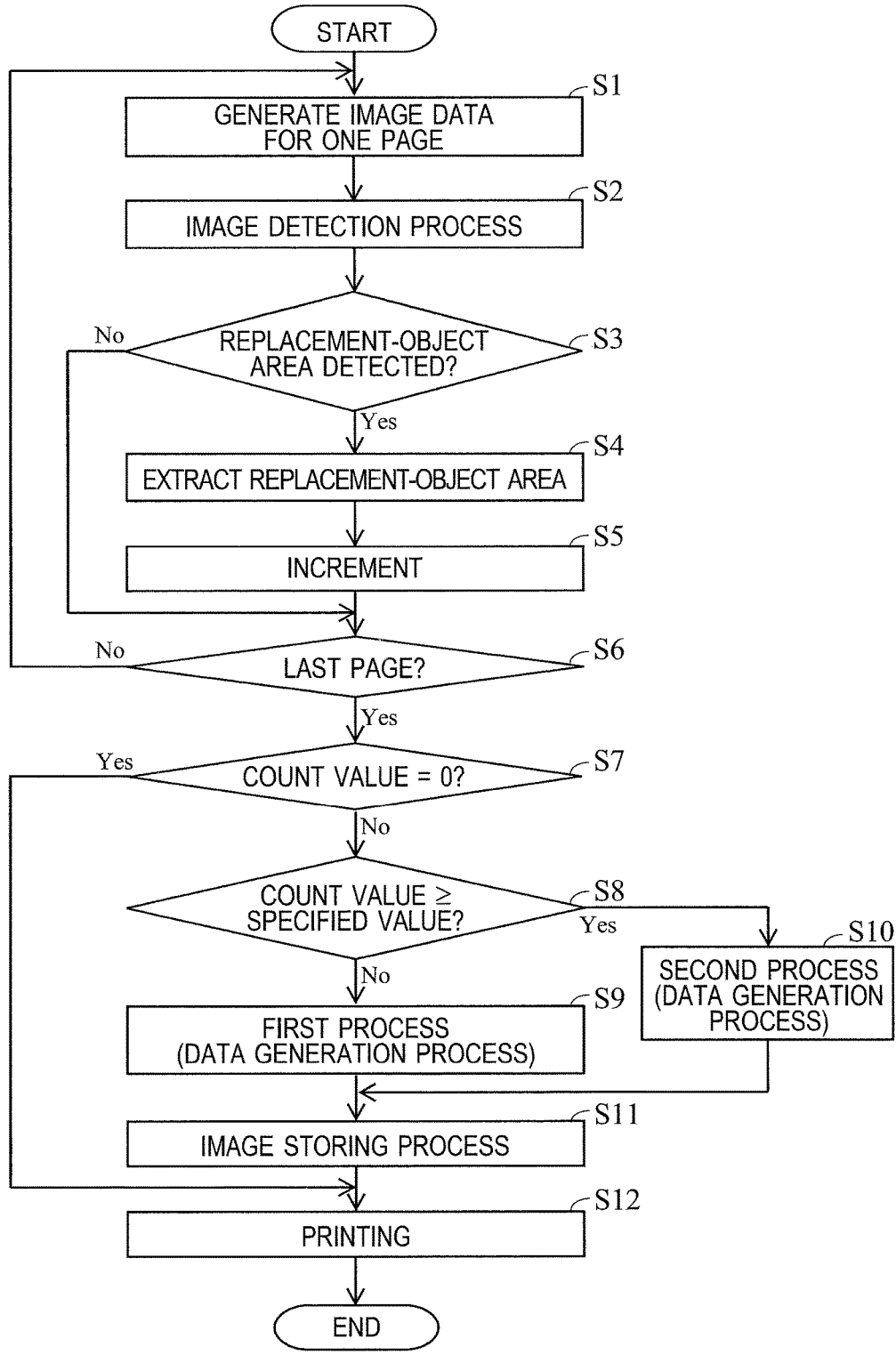
FIG. 3 is a flowchart showing an economy printing process to be executed in the multifunction peripheral of the image forming system according to one embodiment of the disclosure.

A flow of the economy printing process to be executed by the multifunction-peripheral control section 210 will be described below with reference to the flowchart shown in FIG. 3. The flowchart shown in FIG. 3 gets started when the multifunction-peripheral control section 210 has made a decision of having received a print-job execution request.

At step S1, based on print data inputted to the multifunction peripheral 200, the multifunction-peripheral control section 210 generates printing-use image data of one page. Printing-use image data to be generated by the multifunction-peripheral control section 210 in this case are temporarily stored, for example, in the memory 212 of the multifunction-peripheral control section 210.

At step S2, the multifunction-peripheral control section 210 executes an image detection process targeting the printing-use image data of one page generated at step S1. In this case, the image detection process executed by the multifunction-peripheral control section 210 is one process in the economy printing process, and not executed when the economy printing function is set invalid, as an example.

For example, the multifunction-peripheral control section 210 executes a layout analysis process on printing-use image data so that the printing-use image data are classified into character areas and non-character areas which are areas other than the character areas. The multifunction-peripheral control section 210 executes an image recognition process (e.g., labeling process) targeting non-character areas among printing-use image data to decide whether or not images (graphics, photographs, etc.) are present in the non-character areas.

When images are present in the non-character areas among the printing-use image data, the multifunction-peripheral control section 210 recognizes a number of images present in the non-character areas as well as features of the images present in the non-character areas. For example, based on pixel values (color and density) of individual pixels composing each image present in the non-character areas, the multifunction-peripheral control section 210 recognizes toner quantity, toner color and the like necessary for printing the image.

Then, when any area containing an image (image other than characters) whose toner quantity necessary for its printing exceeds a predetermined threshold value is present among printing-use image data, the multifunction-peripheral control section 210 detects the area as a replacement-object area. For example, the threshold value serving as a criterion for detection of a replacement-object area is set by a manufacturer of the multifunction peripheral 200 in order that an area containing image data of a solid image out of printing-use image data is detected as a replacement-object area. In addition, it may also be arranged that the user of the multifunction peripheral 200 is enabled to set (change) the threshold value.

At step S3, the multifunction-peripheral control section 210 decides whether or not replacement-object areas have been detected. As a result, when the multifunction-peripheral control section 210 decides that replacement-object areas have been detected, the processing flow moves on to step S4. Upon movement to step S4, the multifunction-peripheral control section 210 extracts image data of the replacement-object areas from the printing-use image data. The image data of the replacement-object areas are temporarily stored in the memory 212 of the multifunction-peripheral control section 210.

At step S5, the multifunction-peripheral control section 210 increments a count value for detection number of the replacement-object areas. The count value for detection number of the replacement-object areas is incremented by a value corresponding to the number of replacement-object areas detected by the multifunction-peripheral control section 210. Also, the count value for detection number of replacement-object areas is reset at an end of the print job.

Thereafter, the processing flow moves on to step S6. In addition, also when the multifunction-peripheral control section 210 decides at step S3 that no replacement-object areas have been detected, the processing flow moves on to step S6.

Upon movement to step S6, the multifunction-peripheral control section 210 decides whether or not printing-use image data generated by the process of step S1 is image data of the last page. As a result, when the multifunction-peripheral control section 210 decides that the printing-use image data is not the image data of the last page, the processing flow moves on to step S1. In this case, printing-use image data of a next page is generated by the multifunction-peripheral control section 210, and the image detection process for the printing-use image data of the next page is executed. Then, when replacement-object areas are detected from the printing-use image data of the next page, the multifunction-peripheral control section 210 increments the count value for detection number of replacement-object areas.

When the multifunction-peripheral control section 210 decides, at step S6, that the printing-use image data generated by the process of step S1 is image data of the last page, the processing flow moves on to step S7. Upon movement to step S7, the multifunction-peripheral control section 210 decides whether or not the count value for detection number of replacement-object areas is zero. In other words, the multifunction-peripheral control section 210 decides that any replacement-object areas have been detected in the image detection process targeting printing-use image data of the first page to the last page. As a result, when the multifunction-peripheral control section 210 decides that the count value for detection number of replacement-object areas is not zero (replacement-object areas have been detected), the processing flow moves on to step S8.

Upon movement to step S8, the multifunction-peripheral control section 210 decides whether or not the count value for detection number of replacement-object areas is equal to or larger than a specified value (integer of 2 or more). As a result, when the multifunction-peripheral control section 210 decides that the count value is smaller than the specified value, the processing flow moves on to step S9. Conversely, when the multifunction-peripheral control section 210 decides that the count value is equal to or larger than the specified value, the processing flow moves on to step S10. In either case where the processing flow moves on to step S9 or moves on to step S10, the data generation process of newly generating replaced image data is executed by the multifunction-peripheral control section 210. In the data generation process executed by the multifunction-peripheral control section 210, image data of alternative images that are images involving smaller consumption quantities of toner than images contained in the replacement-object areas are generated, and image data in which image data of the replacement-object areas out of the printing-use image data are replaced with image data of the alternative images are newly generated as replaced image data.

In addition, when a plurality of replacement-object areas are present in printing-use image data for one page, image data of the plurality of replacement-object areas are replaced with image data of alternative images, respectively. Also, when replacement-object areas are present in printing-use image data for plural pages, respectively, image data of the individual replacement-object areas in the printing-use image data for plural pages are replaced with image data of alternative images, respectively. In this case, replaced image data equal in number of data pieces to the printing-use image data including the replacement-object areas are newly generated.

Upon movement to step S9, the multifunction-peripheral control section 210 executes a first process as the data generation process. More specifically, the multifunction-peripheral control section 210 generates, as image data of alternative images, image data of code information (e.g., QR code (registered trademark) or other two-dimensional codes) obtained by coding of storage-destination addresses of image data of replacement-object areas. Then, the multifunction-peripheral control section 210 newly generates replaced image data in which image data of replacement-object areas out of printing-use image data have been replaced with the image data of code information. Thereafter, the processing flow moves on to step S11.

Upon movement to step S10, the multifunction-peripheral control section 210 executes a second process as the data generation process. More specifically, the multifunction-peripheral control section 210 generates, as image data of alternative images, image data of AR markers to be correspondingly associated with image data of replacement-object areas. Then, the multifunction-peripheral control section 210 newly generates replaced image data in which image data of replacement-object areas out of printing-use image data have been replaced with the image data of AR markers. Thereafter, the processing flow moves on to step S11.

Upon movement to step S11, the multifunction-peripheral control section 210 executes an image storing process of transmitting the image data of replacement-object areas to the server 300 to store the image data in the server 300. When image data of code information are generated as the image data of alternative images, the multifunction-peripheral control section 210 stores image data of replacement-object areas in the storage-destination addresses embedded in the code information out of the storage region of the server 300. When image data of AR markers are generated as the image data of alternative images, the multifunction-peripheral control section 210 stores image data of replacement-object areas and image data of AR markers, as they are correspondingly associated with each other, in the server 300 (image data of AR markers are also stored in the server 300 together with image data of replacement-object areas).

In addition, image data of replacement-object areas may also be stored in the multifunction-peripheral storage section 230 of the multifunction peripheral 200. In this case, the server 300 may be omitted.

Thereafter, the processing flow moves on to step S12. In addition, also when the multifunction-peripheral control section 210 decides, at step S7, that the count value for detection number of replacement-object areas is zero (no replacement-object areas have been detected), the processing flow moves on to step S12.

Upon movement to step S12, the multifunction-peripheral control section 210 instructs the printing section 2 to execute printing. In this case, when replaced image data are present, the multifunction-peripheral control section 210 suppresses printing based on image data on which the replaced image data have been based and, instead, instructs printing based on the replaced image data.

Figure 4:
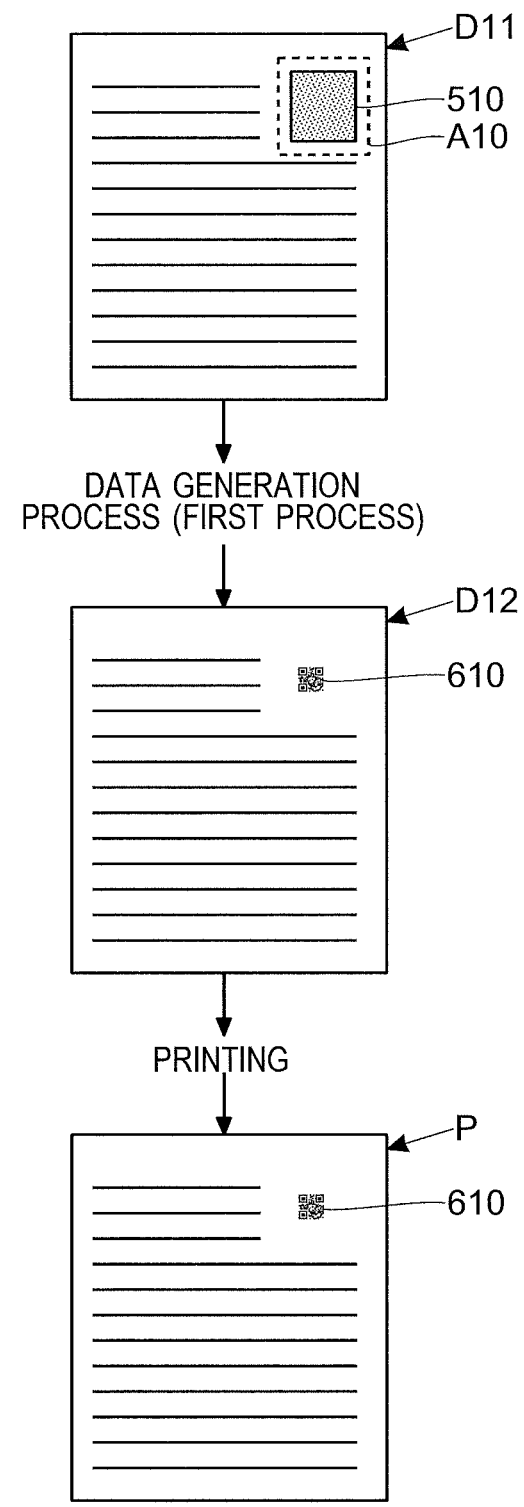
FIG. 4 is a view for explaining a data generation process (first process) to be executed in the multifunction peripheral of the image forming system according to one embodiment of the disclosure.

As an example, assume that print data for one page are inputted to the multifunction peripheral 200 and, as a result, such printing-use image data D11 as shown in an upper-stage view of FIG. 4 is generated by the multifunction-peripheral control section 210. In this case, it is assumed that toner quantity necessary for printing of an image 510 exceeds the threshold value. It is also assumed that the specified value serving as a decision criterion for whether to execute the first process or the second process is set to a value larger than '1' (set to '2' in this case).

In this case, the multifunction-peripheral control section 210 targets the printing-use image data D11 as a processing object of the image detection process. In the image detection process executed by the multifunction-peripheral control section 210 in this case, an area A10 containing the image 510 is detected as a replacement-object area. Thus, the count value for detection number of replacement-object areas results in '1'.

In a case where the count value for detection number of replacement-object areas is '1', since the specified value serving as a decision criterion for whether to execute the first process or the second process is '2' as described above, the multifunction-peripheral control section 210 decides that the count value for detection number of replacement-object areas is smaller than the specified value. As a result, the multifunction-peripheral control section 210 executes the first process as the data generation process. That is, the multifunction-peripheral control section 210 generates image data of code information 610 in which a storage-destination address for image data of the image 510 has been coded. Also, the multifunction-peripheral control section 210 newly generates replaced image data D12 in which the image data of the image 510 has been replaced with image data of the code information 610 (see middle-stage view of FIG. 4).

Thereafter, the multifunction-peripheral control section 210 instructs the printing section 2 to execute toner-saving printing. That is, the printing section 2 prints out an image based on the replaced image data D12 (i.e., image containing the code information 610) onto the sheet P. As a result, the sheet P on which the image based on the replaced image data D12 has been printed is outputted (see lower-stage view of FIG. 4).

Figure 5:
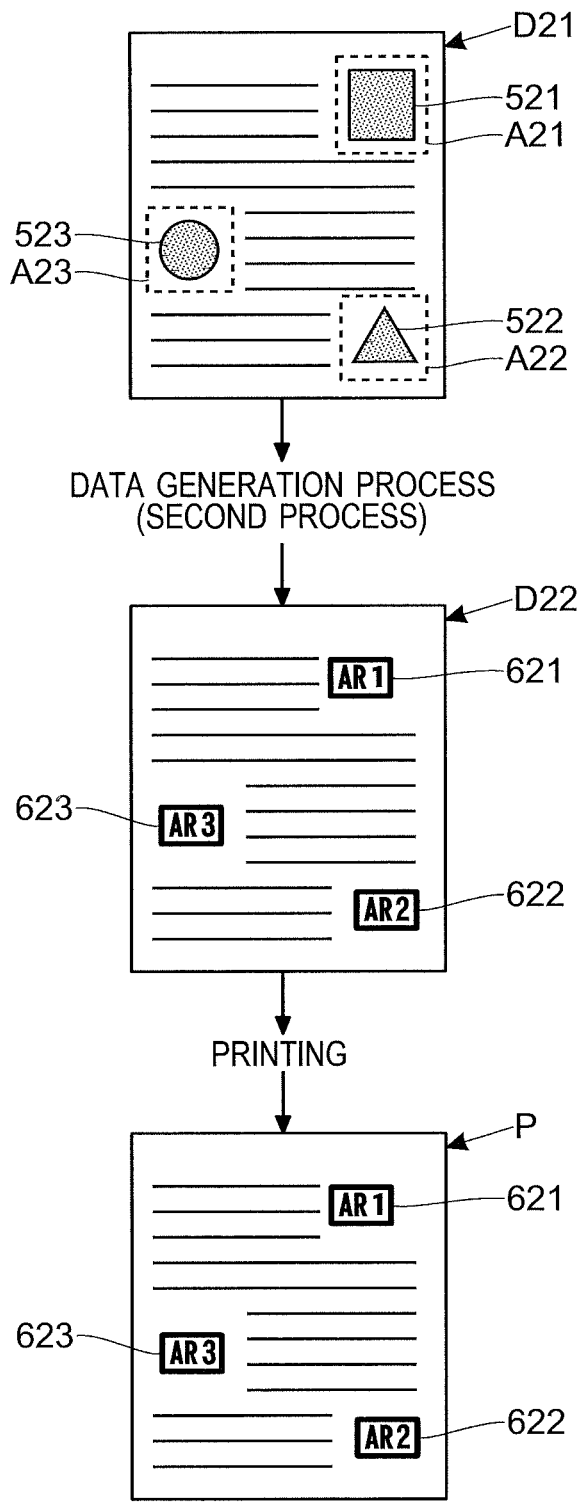
FIG. 5 is a view for explaining a data generation process (second process) to be executed in the multifunction peripheral of the image forming system according to one embodiment of the disclosure.

As another example, assume that print data for one page is inputted to the multifunction peripheral 200, with the result that such printing-use image data D21 as shown in the upper-stage view of FIG. 5 is generated by the multifunction-peripheral control section 210. In this case, it is assumed that individual toner quantities necessary for printing of images 521, 522 and 523, respectively, exceed the threshold value. It is also assumed that the specified value serving as a decision criterion for whether to execute the first process or the second process is set to a value smaller than '3' (set to '2' in this case).

In this case, the multifunction-peripheral control section 210 targets the printing-use image data D21 as a processing object of the image detection process. In the image detection process executed by the multifunction-peripheral control section 210 in this case, an area A21 containing the image 521, an area A22 containing the image 522, and an area A23 containing the image 523 are detected as replacement-object areas, respectively. Thus, the count value for detection number of replacement-object areas results in '3'.

In a case where the count value for detection number of replacement-object areas is '3', since the specified value serving as a decision criterion for whether to execute the first process or the second process is '2' as described above, the multifunction-peripheral control section 210 decides that the count value for detection number of replacement-object areas is larger than the specified value. As a result, the multifunction-peripheral control section 210 executes the second process as the data generation process. That is, the multifunction-peripheral control section 210 generates image data of an AR marker 621 corresponding to image data of the image 521, generates image data of an AR marker 622 corresponding to image data of the image 522, and generates image data of an AR marker 623 corresponding to image data of the image 523. Also, the multifunction-peripheral control section 210 newly generates replaced image data D22 in which the image data of the image 521 has been replaced with the image data of the AR marker 621, the image data of the image 522 has been replaced with the image data of the AR marker 622, and in which the image data of the image 523 has been replaced with the image data of the AR marker 623 (see middle-stage view of FIG. 5).

Thereafter, the multifunction-peripheral control section 210 instructs the printing section 2 to execute toner-saving printing. That is, the printing section 2 prints out image based on the replaced image data D22 (i.e., image containing the AR markers 621, 622 and 623) onto the sheet P. As a result, the sheet P on which the image based on the replaced image data D22 has been printed is outputted (see lower-stage view of FIG. 5).

For example, the operation panel 3 accepts, from the user, a setting as to whether to set the economy printing function valid or invalid. Then, with the economy printing function set valid and with any replacement-object area present in printing-use image data, the multifunction-peripheral control section 210 instructs the printing section 2 to execute the toner-saving printing. On the other hand, in a case where the economy printing function is set invalid or where no replacement-object area is present in printing-use image data even with the economy printing function set valid, the multifunction-peripheral control section 210 blocks the printing section 2 from executing the toner-saving printing.

Otherwise, the multifunction-peripheral control section 210 decides whether or not a specified condition is satisfied.

Then, in a case where any replacement-object area is present in the printing-use image data, when the specified condition is satisfied, the multifunction-peripheral control section 210 instructs the printing section 2 to execute the toner-saving printing. Conversely, when the specified condition is not satisfied, the multifunction-peripheral control section 210 blocks the printing section 2 from executing the toner-saving printing even with any replacement-object area present in the printing-use image data. Now the specified condition will be explained below.

For example, the multifunction peripheral 200 is equipped with a trial printing function. The trial printing function is a function of printing only one copy as a trial in cases where a task of printing plural copies is executed. The operation panel 3 accepts, from the user, a setting for whether or not the trial printing function is executed (the trial printing function is set valid or invalid).

In a case where a replacement-object area is present in printing-use image data, on condition that the setting for executing the trial printing has been validated, the multifunction-peripheral control section 210 decides that the specified condition is satisfied, instructing the printing section 2 to execute the toner-saving printing. As a result, the consumption quantity of toner can be reduced on opportunities when the trial printing is executed. In addition, on condition that the setting for executing the trial printing has not been validated, the multifunction-peripheral control section 210 blocks the printing section 2 from executing the toner-saving printing even with any replacement-object area present in the printing-use image data.

Furthermore, on condition that any replacement-object area is present in printing-use image data subjected to color-to-monochrome conversion, the multifunction-peripheral control section 210 detects remaining quantity of black toner to be used for monochrome printing. Then, when the remaining quantity of black toner is smaller than a predetermined threshold remaining quantity, the multifunction-peripheral control section 210 decides that the specified condition is satisfied, instructing the printing section 2 to execute the toner-saving printing. As a result, indeed consumption quantity of black toner is increased in executing monochrome printing by way of color-to-monochrome conversion, but the extent of such increases can be reduced. In addition, on condition that the remaining quantity of black toner is not smaller than the threshold remaining quantity, the multifunction-peripheral control section 210 blocks the printing section 2 from executing the toner-saving printing even with any replacement-object area present in printing-use image data.

<Reading of Alternative Images>

A code reader application is installed on the information terminal 400. Therefore, when the toner-saving printing (printing of code information) is executed, reading the code information by using the camera 420 of the information terminal 400 allows the user to know a storage-destination address embedded in the code information.

Figure 6:
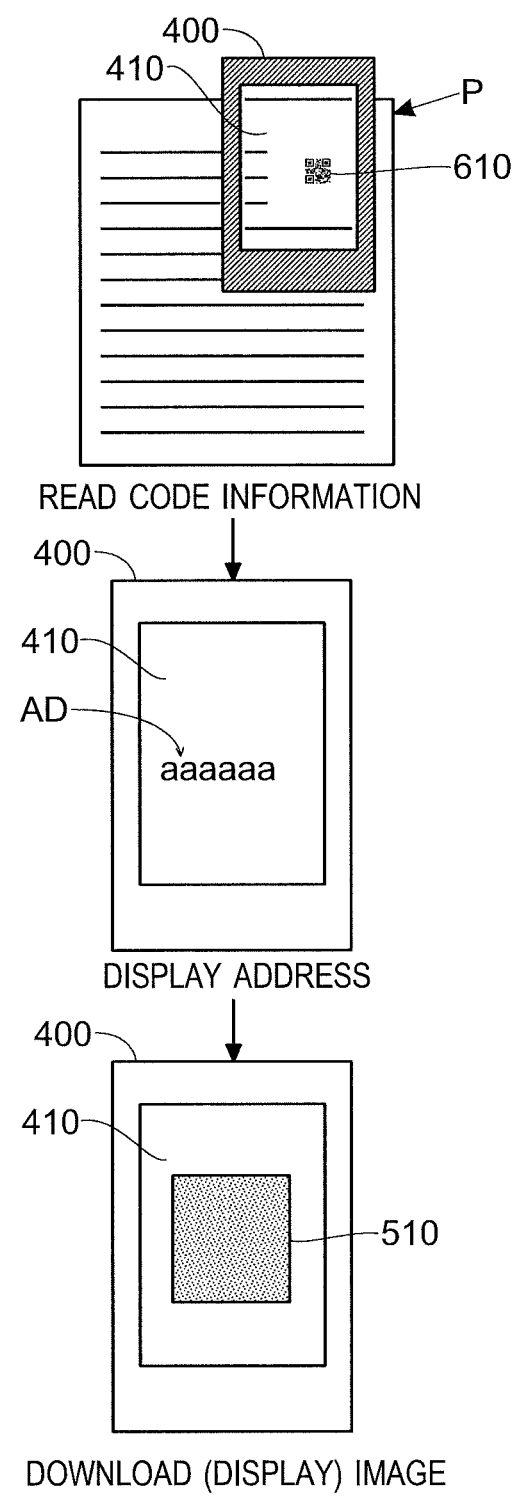
FIG. 6 is a view in which code information is read by an information terminal of the image forming system according to one embodiment of the disclosure.

As an example, assume that the code information 610 shown in the lower-stage view of FIG. 4 is read by the camera 420 of the information terminal 400 (see upper-stage view of FIG. 6). In this case, an address AD is displayed in the touch panel display 410 of the information terminal 400 (see middle-stage view of FIG. 6).

The address AD displayed in the touch panel display 410 of the information terminal 400 is a storage-destination address of the image 510 (see upper-stage view of FIG. 4). The user's touching on the display area of the address AD causes the image data of the image 510 to be downloaded from the server 300 to the information terminal 400. The information terminal 400, for example, converts the image data of the image 510 into display-use image data. As a result, the image 510 is displayed on the touch panel display 410 of the information terminal 400 (see lower-stage view of FIG. 6).

Also, an AR application is installed on the information terminal 400. Therefore, in the case where the toner-saving printing (printing of AR markers) is executed, photographing (reading) of an AR marker with the camera 420 of the information terminal 400 makes it possible to display an image associated with the AR marker on the touch panel display 410 of the information terminal 400.

Figure 7:
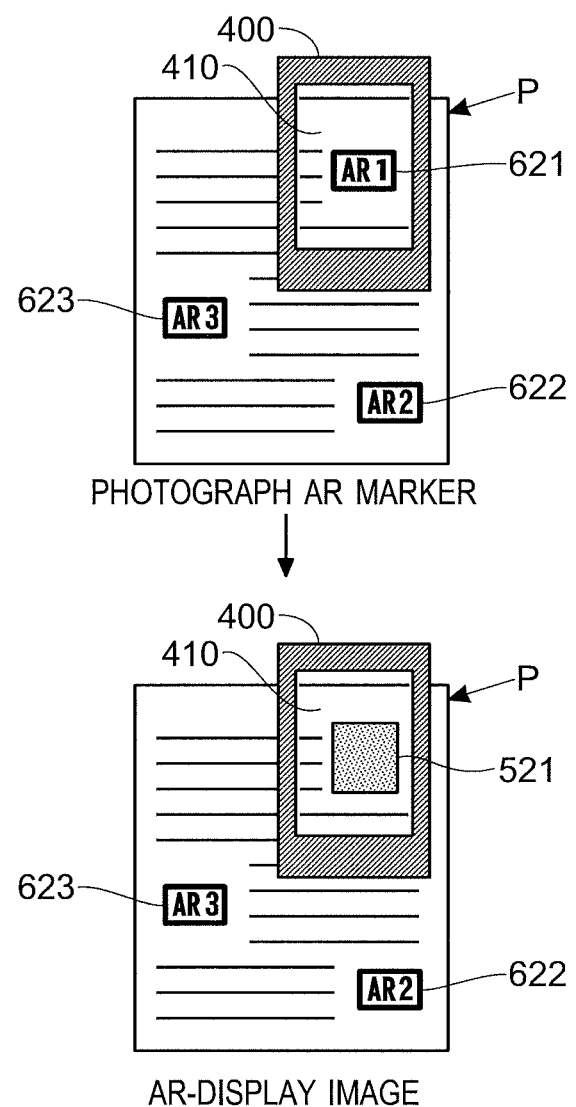
FIG. 7 is a view in which AR markers are read by the information terminal of the image forming system according to one embodiment of the disclosure.

As an example, assume that the AR marker 621 shown in the lower-stage view of FIG. 5 is photographed by the camera 420 of the information terminal 400 (see upper-stage view of FIG. 7). In this case, the information terminal 400 recognizes the AR marker 621 and transmits, to the server 300, feature information indicative of features (e.g., profile, pattern, color, etc.) of the AR marker 621 (i.e., information for allowing an image based on image data of a replacement-object area to be displayed on the information terminal 400).

The server 300, receiving feature information from the information terminal 400, decides, based on the received feature information, that the information terminal 400 has photographed the AR marker 621. Then, the server 300 transmits, to the information terminal 400, image data of the image 521 (see upper-stage view of FIG. 5) corresponding to the AR marker 621.

The information terminal 400, receiving image data of the image 521 from the server 300, converts the image data of the image 521 into image data for use of AR display, as an example. Then, the information terminal 400 displays, in superimposition, the image 521 at a position of the AR marker 621 out of photographed images photographed by the camera 420 and displayed on the touch panel display 410. It seems to the user that the image 521 is synthesized with the photographed image (see lower-stage view of FIG. 7).

The multifunction peripheral 200 (image forming apparatus) of this embodiment, as described above, includes the printing section 2 for printing an image onto a paper sheet P with use of toner (color material), and the multifunction-peripheral control section 210 (control section) for generating printing-use image data to allow the printing section 2 to execute printing as well as for controlling the printing section 2. The multifunction-peripheral control section 210 executes an image detection process of detecting, as a replacement-object area, an area containing an image involving a larger consumption quantity of the toner than a predetermined threshold value out of the printing-use image data, where when the replacement-object area is detected, the multifunction-peripheral control section 210 executes a data generation process of generating image data of an alternative image involving a smaller consumption quantity of toner than the image contained in the replacement-object area and then generating replaced image data in which the image data of the replacement-object area out of the printing-use image data has been replaced with the image data of the alternative image, the multifunction-peripheral control section 210 further executes an image storing process of storing the image data of the replacement-object area in a specified storage region, and moreover instructs the printing section 2 to execute toner-saving printing of printing an image based on the replaced image data on a sheet P. In addition, the alternative image is an image containing information for allowing the image based on the image data of the replacement-object area to be displayed by an information terminal that has read the alternative image.

With the configuration of this embodiment, in a case where a replacement-object area (area containing an image involving a consumption quantity of toner larger than a threshold value) is present in printing-use image data, an alternative image involving a smaller consumption quantity of toner than an image contained in the replacement-object area is printed on the sheet P instead of the image contained in the replacement-object area. That is, toner-saving printing is executed. By virtue of this, the consumption quantity of toner used for printing can be reduced. In this case, for the user that has acquired a printed matter obtained by toner-saving printing (sheet P with the alternative image printed thereon), reading the alternative image by the user's own information terminal 400 allows an image based on image data of the replacement-object area (image that has not been printed because of its larger consumption quantity of toner) to be displayed on the information terminal 400. Thus, even when the alternative image is printed on the sheet P instead of the image contained in the replacement-object area, degradation in the user's convenience can be suppressed.

Also in this embodiment, as described above, the multifunction-peripheral control section 210 executes a first process or a second process as a data generation process. In the first process, image data of code information in which a storage-destination address for image data of a replacement-object area has been coded is generated as image data of an alternative image, and the image data of the replacement-object area is replaced with the image data of code information (the code information is printed on the sheet P as the alternative image). In the second process, image data of an AR marker corresponding to image data of a replacement-object area is generated, and the image data of the replacement-object area is replaced with the image data of the AR marker (the AR marker is printed on the sheet P as the alternative image).

In the case where code information has been printed on the sheet P, reading the code information printed on the sheet P by the information terminal 400 allows a storage-destination address for the image data of the replacement-object area to be displayed on the information terminal 400. Then, accessing the storage-destination address allows the image data of the replacement-object area to be downloaded to the information terminal 400. Thus, the image based on the image data of the replacement-object area can be displayed on the information terminal 400 with simplicity.

In the case where the AR marker has been printed on the sheet P, only holding the information terminal 400 upward of the sheet P with the AR marker printed thereon (only photographing the AR marker) allows the image based on the image data of the replacement-object area to be displayed on the information terminal 400. As a result of this, contents of the image contained in the replacement-object area can be confirmed with more simplicity.

Also in this embodiment, as described above, the multifunction-peripheral control section 210 executes the first process with the detection number of replacement-object areas smaller than a specified number, and executes the second process with the detection number of replacement-object areas equal to or larger than the specified number. That is, given a larger number of alternative images to be printed on the sheet P, AR markers are printed on the sheet P as alternative images. In this case, although a large number of AR markers are printed on the sheet P, yet only holding the information terminal 400 upward of the sheet P allows images based on image data of the replacement-object areas to be displayed on the information terminal 400, thus facilitating the confirmation of image contents contained in the replacement-object areas (taking less time and labor).

The embodiment herein disclosed should be construed as only an exemplification at all points and not as limitative. The scope of the disclosure is defined not by the above description of the embodiment but by the appended claims, including all changes and modifications equal in sense and scope to the appended claims.

What is claimed is:

1. An image forming apparatus comprising:
    a printing section for printing an image onto a paper sheet with use of color material; and
    a control section for generating printing-use image data to allow the printing section to execute printing as well as for controlling the printing section, wherein
    the control section executes an image detection process of detecting, as a replacement-object area, an area containing an image involving a larger consumption quantity of the color material than a predetermined threshold value out of the printing-use image data, where when the replacement-object area is detected, the control section executes a data generation process of generating image data of an alternative image involving a smaller consumption quantity of the color material than the image contained in the replacement-object area and then generating replaced image data in which the image data of the replacement-object area out of the printing-use image data has been replaced with the image data of the alternative image, and the control section further executes an image storing process of storing the image data of the replacement-object area in a specified storage region, and moreover instructs the printing section to execute color material-saving printing of printing an image based on the replaced image data on a sheet, and
    the alternative image is an image containing information for allowing the image based on the image data of the replacement-object area to be displayed by an information terminal that has read the alternative image.

2. The image forming apparatus according to claim 1, wherein
    for generation of the replaced image data, the control section: executes a first process of generating, as image data of the alternative image, image data of code information in which a storage-destination address for image data of the replacement-object area has been coded, and replacing the image data of the replacement-object area with the image data of the code information; or executes a second process of generating image data of an Augmented Reality (AR) marker to be correspondingly associated with image data of the replacement-object area, and replacing the image data of the replacement-object area with the image data of the AR marker, where for execution of the second process, the control section stores, in the storage region, the image data of the replacement-object area and the image data of the AR marker in corresponding association with each other.

3. The image forming apparatus according to claim 2, wherein
    when having detected a plurality of the replacement-object areas by the image detection process, the control section executes the first process or the second process for each one of the plural replacement-object areas, where
    the control section executes the first process when a detection number of the replacement-object areas is smaller than a specified number, and executes the second process when the detection number of the replacement-object areas is equal to or larger than the specified number.

4. The image forming apparatus according to claim 1, further comprising
    an acceptance part for accepting, from a user, a setting as to whether or not to execute a trial printing, wherein
    in a case where the replacement-object area is present in the printing-use image data, the control section: given a setting for executing the trial printing, instructs the printing section to execute the color material-saving printing; or given no setting for executing the trial printing, blocks the printing section from executing the color material-saving printing even with the replacement-object area present in the printing-use image data.

5. The image forming apparatus according to claim 1, wherein
    in a case where the replacement-object area is present in the printing-use image data subjected to conversion from color image data to monochrome image data, the control section decides whether or not a remaining quantity of black color material to be used for monochrome printing is smaller than a predetermined threshold remaining quantity, where when the remaining quantity of the black color material is smaller than the threshold remaining quantity, the control section instructs the printing section to execute the color material-saving printing, or when the remaining quantity of the black color material is equal to or larger than the threshold remaining quantity, the control section blocks the printing section from executing the color material-saving printing even with the replacement-object area present in the printing-use image data.

6. An image forming system comprising:
    the image forming apparatus as defined in claim 1;
    a server for storing image data of the replacement-object area; and
    an information terminal which includes a camera and a display and which reads the alternative image by the camera and displays an image based on the image data of the replacement-object area on the display.

* * * * *